United States Patent
Yu (10) Patent No.: US 7,611,036 B2
(45) Date of Patent: Nov. 3, 2009

(54) FILM FEEDING MACHINE

(75) Inventor: Tsung-Wen Yu, Taichung Hsien (TW)

(73) Assignee: Snyang Yu Enterprise Co., Ltd., Taichung Hsien (TW)

( * ) Notice: Subject to any disclaimer, the term of this patent is extended or adjusted under 35 U.S.C. 154(b) by 0 days.

(21) Appl. No.: 11/705,126

(22) Filed: Feb. 12, 2007

(65) Prior Publication Data
US 2008/0143016 A1   Jun. 19, 2008

(51) Int. Cl.
*B65H 20/00* (2006.01)
*B29C 53/00* (2006.01)

(52) U.S. Cl. .............. 226/188; 226/128; 226/129; 425/113; 425/126.1; 83/225

(58) Field of Classification Search ......... 425/112–114, 425/127, 129.1, 143, 384, 126.1, 202, 292, 425/305.1, 307, 317, 122, 302.1; 264/269, 264/521, 522, 544, 550, 516; 226/112, 128, 226/129, 188, 12, 92; 242/564.3; 83/404, 83/410.9, 412, 436.1, 436.15, 202, 225, 227, 83/230, 266, 268, 279, 280, 282
See application file for complete search history.

(56) References Cited

U.S. PATENT DOCUMENTS

| 2,976,658 | A | * | 3/1961 | Kostur | 53/509 |
| 3,514,836 | A | * | 6/1970 | Mason | 29/564.2 |
| 4,175,456 | A | * | 11/1979 | Seragnoli | 83/176 |
| 4,360,329 | A | * | 11/1982 | Hatakeyama | 425/112 |
| 4,554,775 | A | * | 11/1985 | Asami et al. | 53/64 |
| 4,601,225 | A | * | 7/1986 | Starnes et al. | 83/175 |
| 4,645,558 | A | * | 2/1987 | Sato | 156/351 |
| 5,082,435 | A | * | 1/1992 | Kuramitsu et al. | 425/117 |
| 5,676,981 | A | * | 10/1997 | Miyazaki et al. | 425/112 |
| 5,707,581 | A | * | 1/1998 | Yamazaki | 264/511 |
| 5,945,059 | A | * | 8/1999 | Atake | 264/510 |
| 6,045,738 | A | * | 4/2000 | Atake | 264/266 |
| 6,270,331 | B1 | * | 8/2001 | Oono et al. | 425/112 |
| 6,321,967 | B1 | * | 11/2001 | Michalik et al. | 226/91 |
| 6,475,423 | B1 | * | 11/2002 | Masterson et al. | 264/511 |
| 6,497,567 | B1 | * | 12/2002 | Eschenfelder et al. | 425/127 |
| 6,730,251 | B1 | * | 5/2004 | Eschenfelder et al. | 264/153 |
| 6,868,644 | B2 | * | 3/2005 | Frankefort et al. | 52/455 |
| 7,114,936 | B2 | * | 10/2006 | Oono et al. | 425/112 |
| 2002/0148875 | A1 | * | 10/2002 | Prittie | 226/118.3 |
| 2002/0155187 | A1 | * | 10/2002 | Kang | 425/121 |
| 2004/0253333 | A1 | * | 12/2004 | Otsuka | 425/112 |

FOREIGN PATENT DOCUMENTS

| JP | 56126144 A | * | 10/1981 |
| JP | 60131213 A | * | 7/1985 |
| WO | WO 2005105635 A1 | * | 11/2005 |

* cited by examiner

*Primary Examiner*—Philip C Tucker
*Assistant Examiner*—Dimple N Bodawala
(74) *Attorney, Agent, or Firm*—Browdy and Neimark, P.L.L.C.

(57) ABSTRACT

A film feeding machine includes a drawing device to draw a continuous film out of a film base to a predetermined position. The film is held by a feeding device and cut off by a cutting device to have a film piece. The film piece is fed to external equipment by the feeding device. The film feeding machine of the present invention is incorporated in a molding process having advantages of lower cost, lower defective ratio and high production efficiency.

12 Claims, 16 Drawing Sheets

FILM FEEDING MACHINE

BACKGROUND OF THE INVENTION

1. Field of the Invention

The present invention relates to a transporting device, and more particularly to a film feeding machine.

2. Description of the Related Art

Thin film processes and tasks are incorporated in many industries. Prior art FIGS. 1 to 5 show a film feeding machine 1 and a die assembly 2 having a first die member 2a and a second die member 2b which are incorporated in a film molding process. The film feeding machine 1 includes a reel 3 and a clip device 4 respectively located above and under the die assembly 2. A roll of a film 5 is mounted on the reel 3 to provide the film 5 between the first die member 2a and the second die member 2b, and the clip device 4 holds the film at an opposite side of the die assembly 2. A heater 6 is moved to a position between the first die member 2a and the second die member 2b and moved toward the film 5 to press the film 5 on the second die member 2b and heat it. Next, the film 5 is suck on a sidewall of a recess of the second die member 2b by vacuum, and then the first die member 2a and the second die member 2b are combined together for injection molding process. After the injection molding process, the film 5 is cut off and the clip device 4 releases the residual film 5a (referring to FIG. 5) to get a product 7 with the film on a surface thereof after the die assembly 2 is opened. Above steps may be repeated for mass production.

However, above process must have the clip device 4 to straight the film 5 from the roll and the film 5 must extend out of the die assembly 2 to be held by the clip device 4, therefore there always is a section of the film 5 being cut off every time when the product is molded. The cut-off film is waste (referring to FIG. 4 and FIG. 5) and there will be a greater amount of the film being waste in mass production. In addition, the reel 3 and the clip device 4 can not provide the film 5 with a precise tension that may cause the injection molding process failure. Again, the above process must include the step of cutting the film off that increases the time of the whole process. The heater 6 is an external device, which must have a controller to be operated, and it increases the space and cost for the whole equipment.

SUMMARY OF THE INVENTION

The primary objective of the present invention is to provide a film feeding machine for the molding process that has advantages of lower cost, less space taken, lower defective ratio and high efficiency.

According to the objective of the present invention, a film feeding machine includes a frame. A film base is provided on the frame to carry a continuous film. A feeding device is moved along a first axis between an extended position and a retracted position for holding and transporting the film. A drawing device, which is located beside the first axis, draws the film out of the film base to a position to be held by the feeding device. A cutting device, which is beside the first axis and between the feeding device and the film base, cuts the film off to have a film piece.

DETAILED DESCRIPTION OF THE INVENTION

As shown in FIGS. 6 to 17, a film feeding machine 100 of the preferred embodiment of the present invention comprises a frame 10, a feeding device 20, a film base 30, a drawing device 40, a cutting device 50 and a heating device 60.

Figure 1:
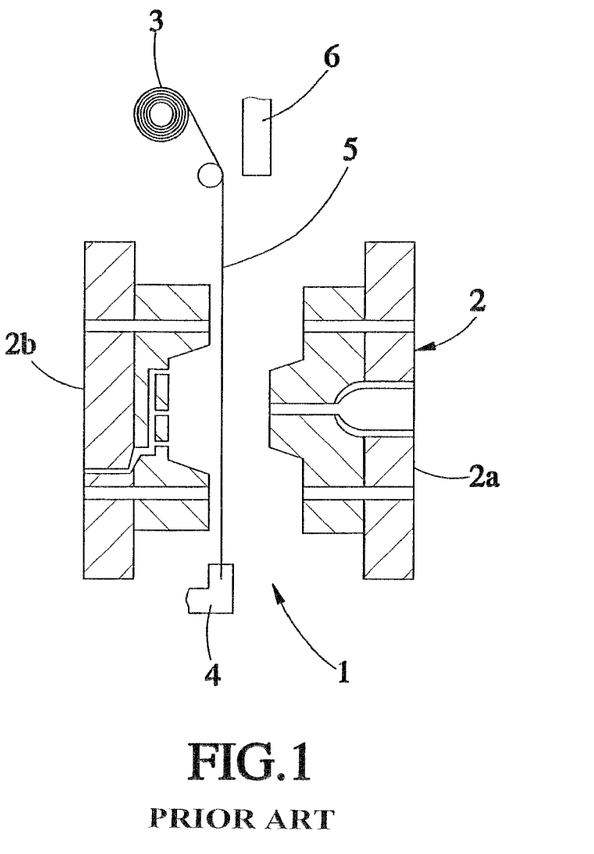
FIG. 1 to FIG. 5 are sketch diagrams of the conventional equipment for the molding process.
Figure 2:
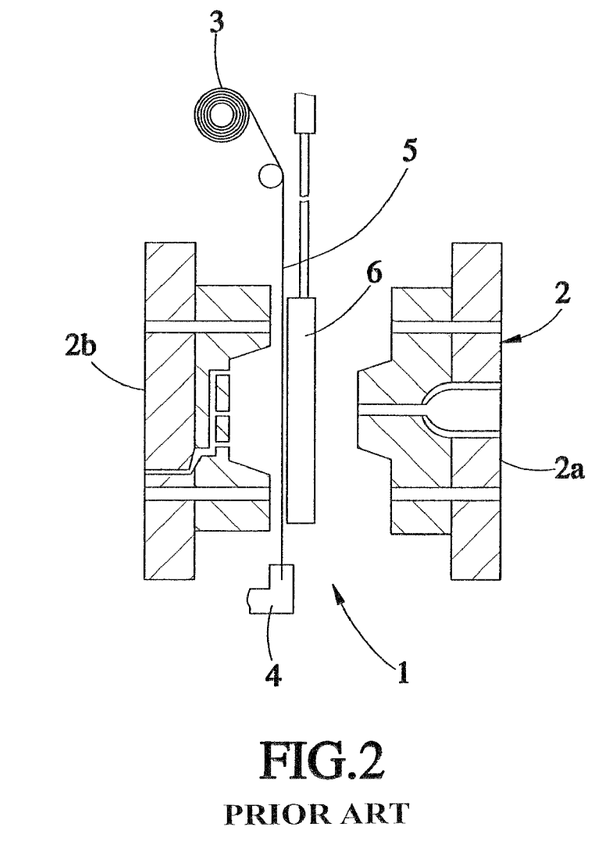
Figure 3:
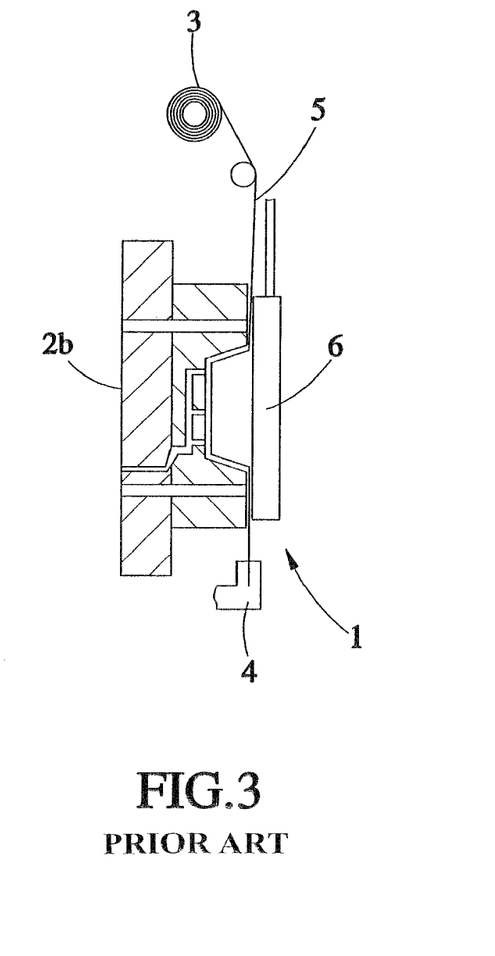
Figure 4:
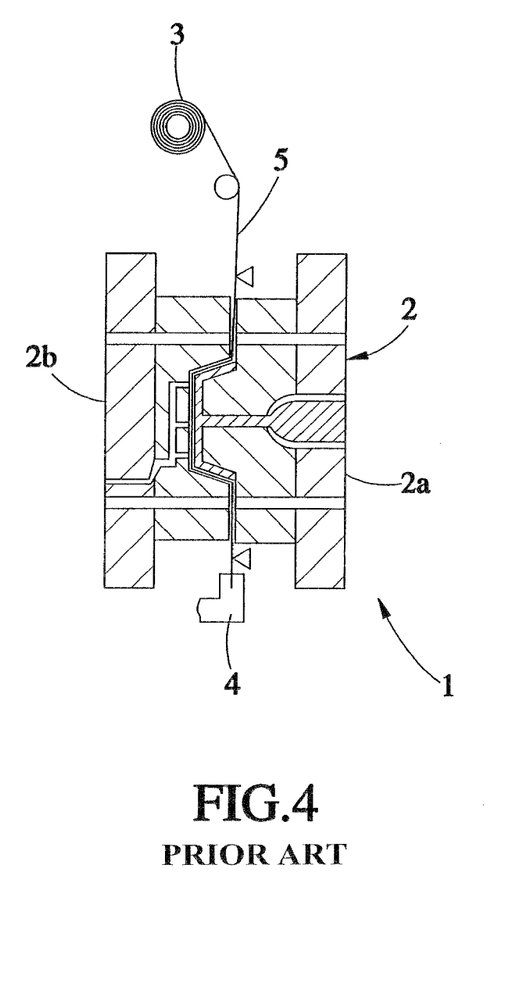
Figure 5:
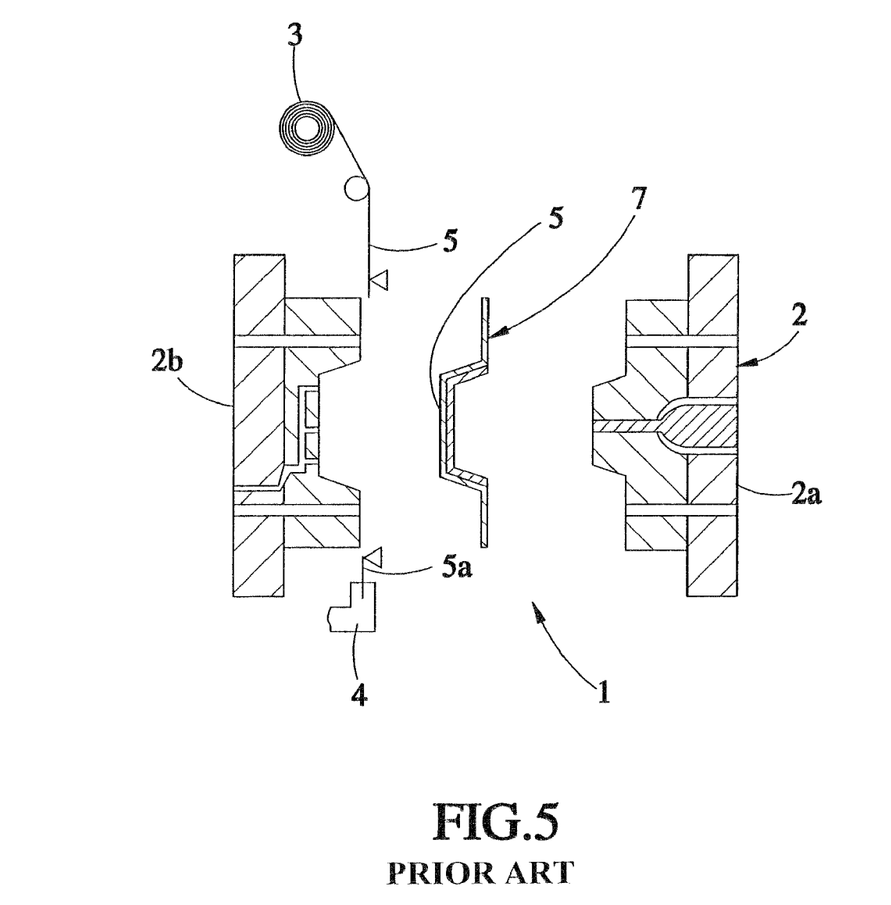
Figure 6:
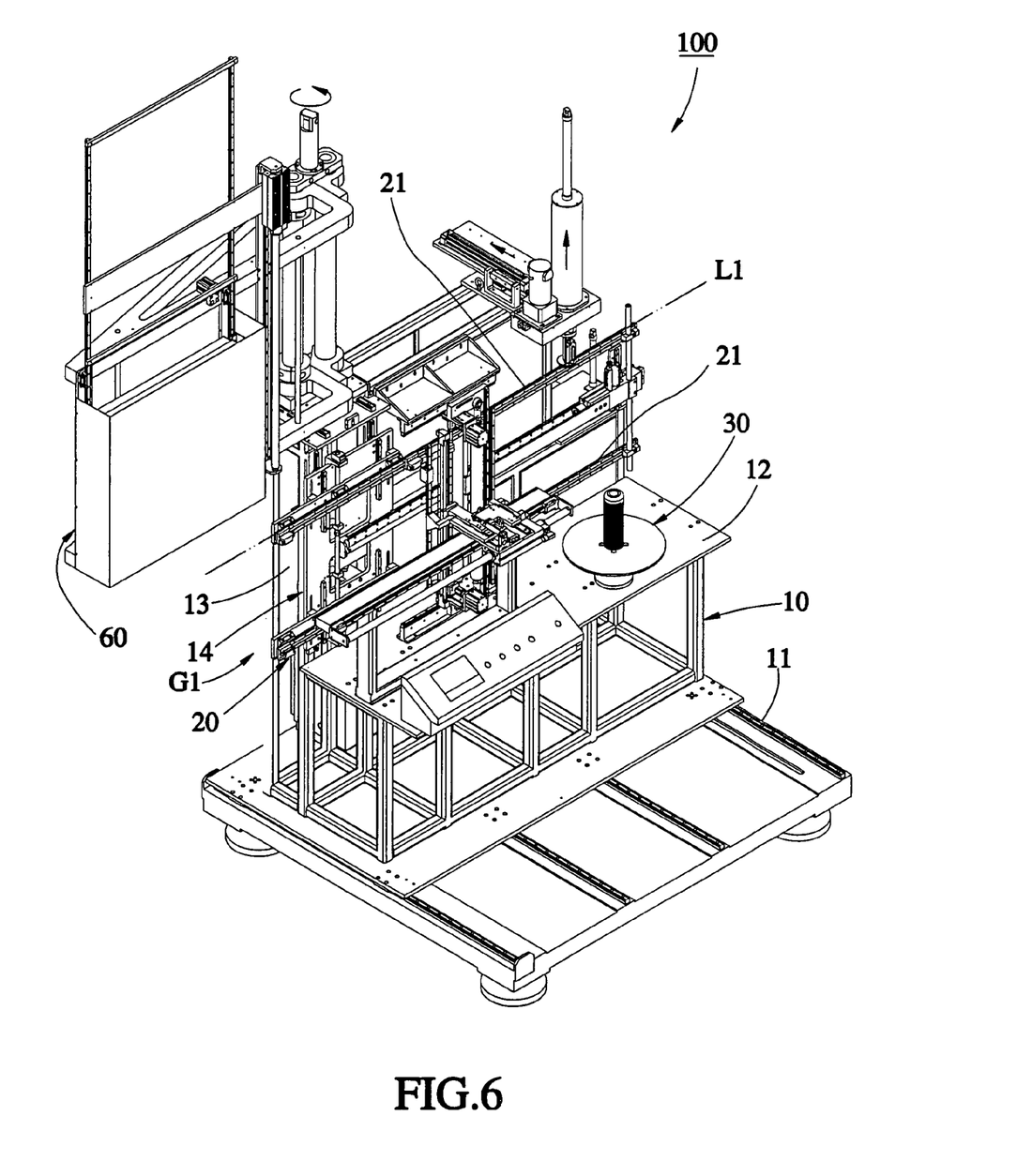
FIG. 6 is a perspective view of a preferred embodiment of the present invention.
Figure 7:
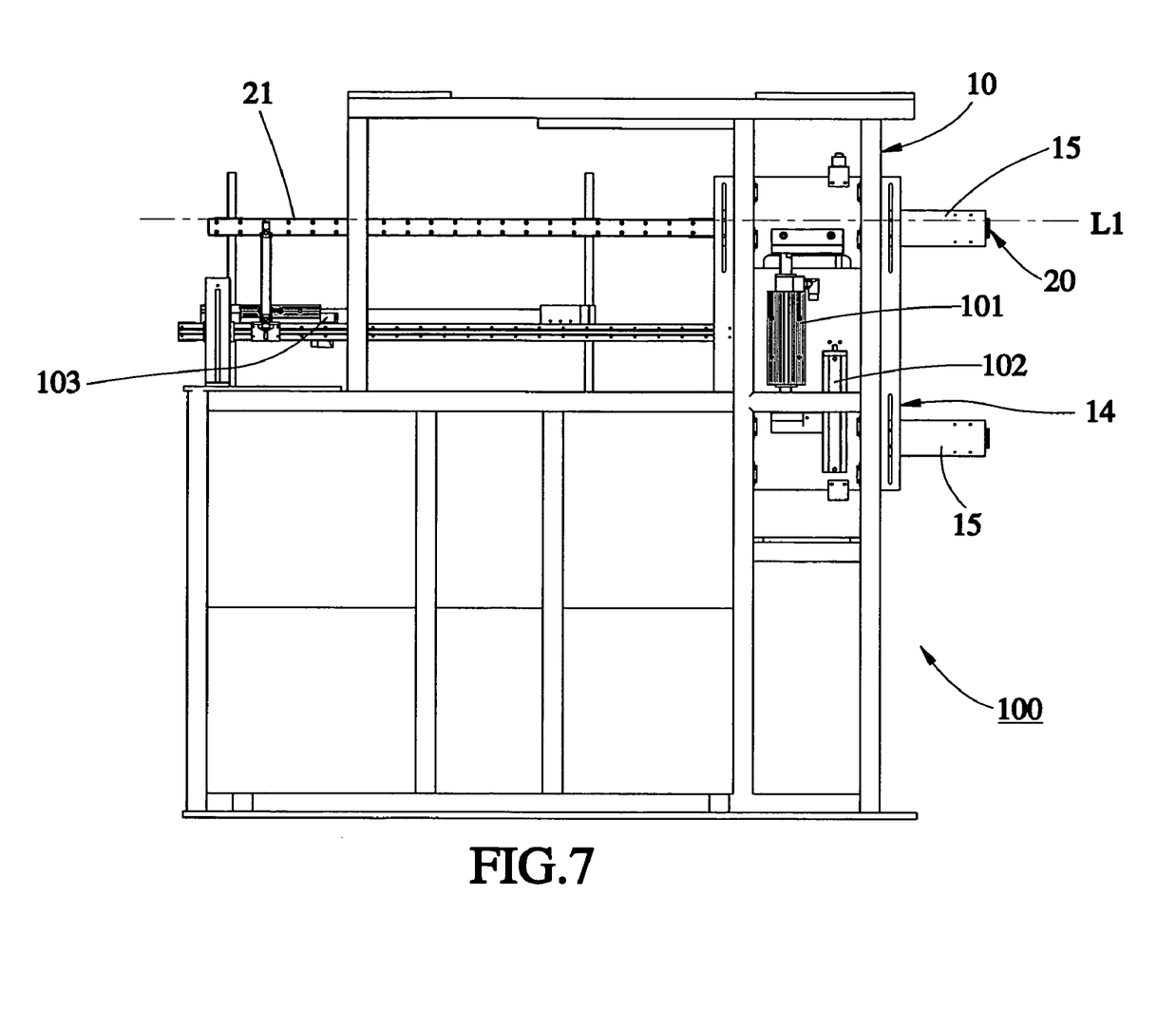
FIG. 7 is a rear view of FIG. 6, showing the serve axle and the weight cylinder.
Figure 8:
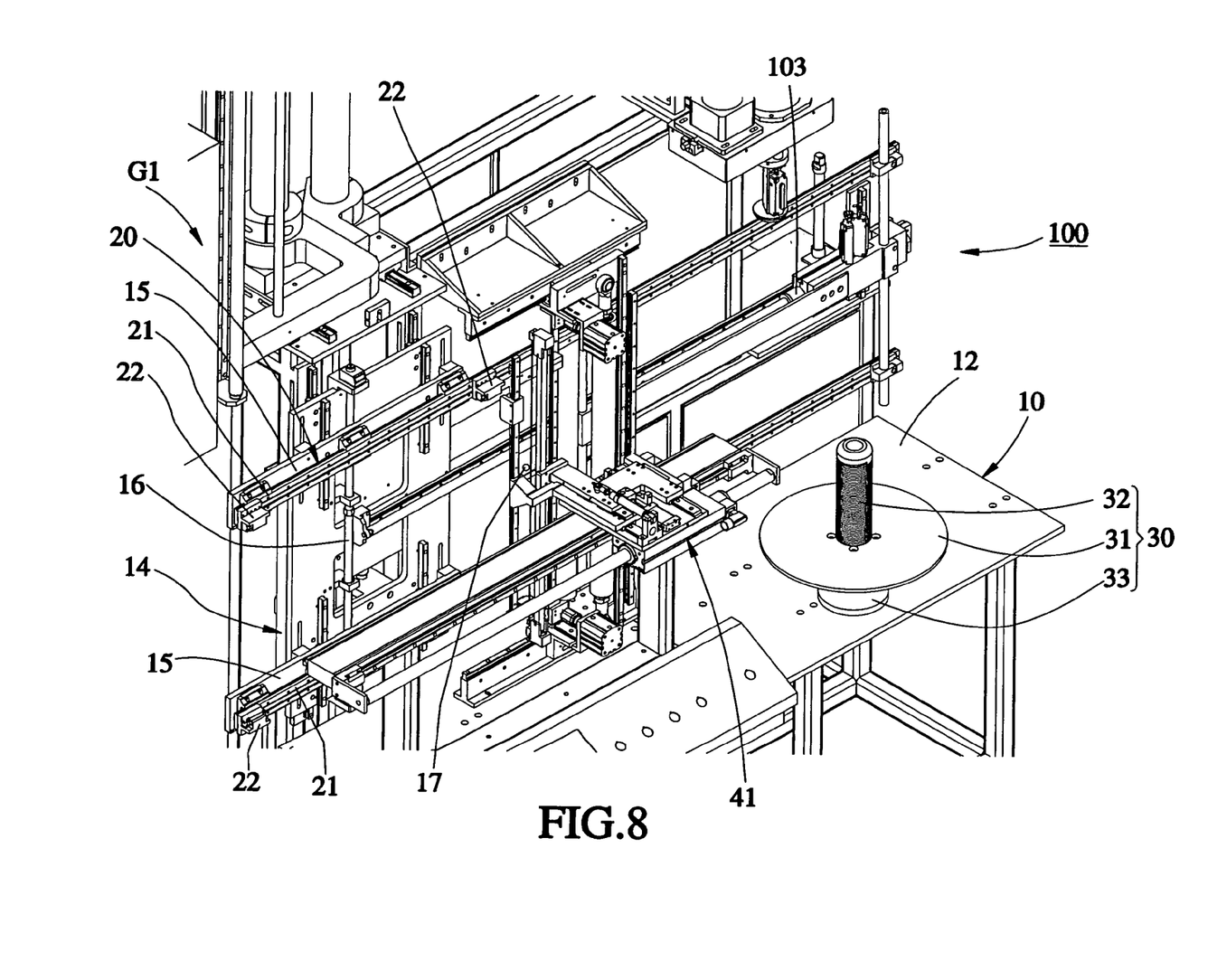
FIG. 8 is an enlarged view in part of FIG. 6.

As shown in FIGS. 6 to 8, the frame 10 has a movable base 11 for horizontal movement, a horizontal plate 12 and a vertical plate 13. The film base is mounted on the horizontal plate 12, and a support base 14 and the feeding device 20 is mounted on the vertical plate 13. A plane where the feeding device 20 is located is defined as a first axis L1. As shown in FIG. 7, the support base 14 is moved stably along the first axis L1 relative to the frame 10 by a serve axle 101 and a weight cylinder 102. The support base 14 includes two rail bases 15 (referring to FIG. 8) to be moved by two opposite worms 16. As a result, the feeding device 20 on the support base 11 fits various sizes of films and may be adjusted in height to fit a die assembly 200 and an injection molding machine 300 (referring to FIG. 18). The frame 10 is provided with a sensor 17 to sense targets printed on the film (not shown) for adjustment of the feeding device 20 along a direction perpendicular to the first axis L1 by the serve axle 101 and the weight cylinder 102 through a control system so that the film is positioned before being sent to an external device (which is the injection molding machine 300 shown in FIG. 18).

The feeding device 20 includes two arms 21, which are connected to the rail bases 15 of the support base 14. The arms 21 are moved by a serve axle 103 between a retracted position G1 (referring to FIG. 6) and an extended position G2 (referring to FIG. 17). The serve axle 103 is controlled by the sensor 17 also to adjust the feeding device 20 along the first axis L1 for position of the film. The arms 21 have a clip portion associated with two clip cylinders 22 respectively. The clip cylinders 22 may hold four corners of the film to transport it.

Figure 9:
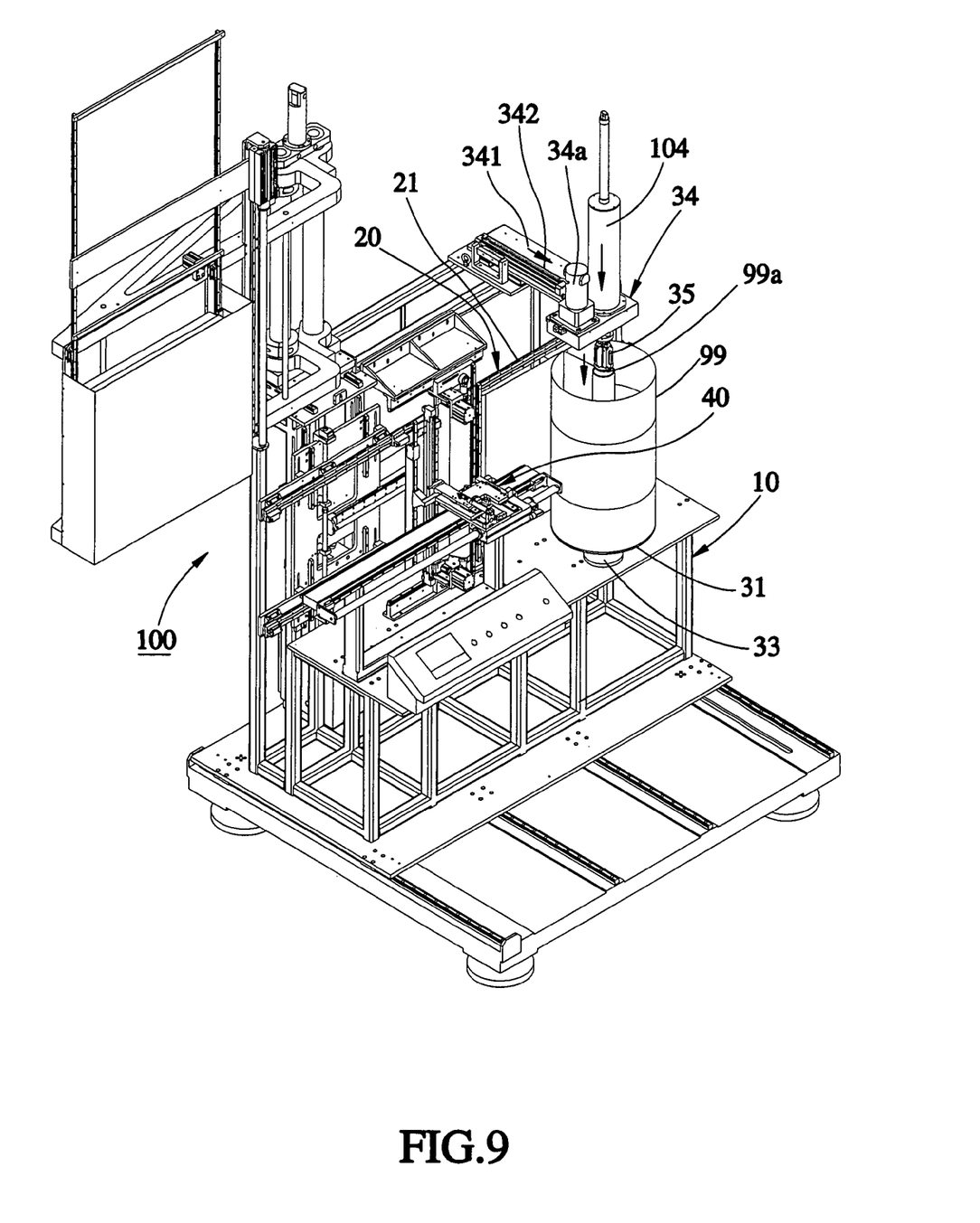
FIG. 9 is a perspective view of the film being drawn to the first position.
Figure 10:
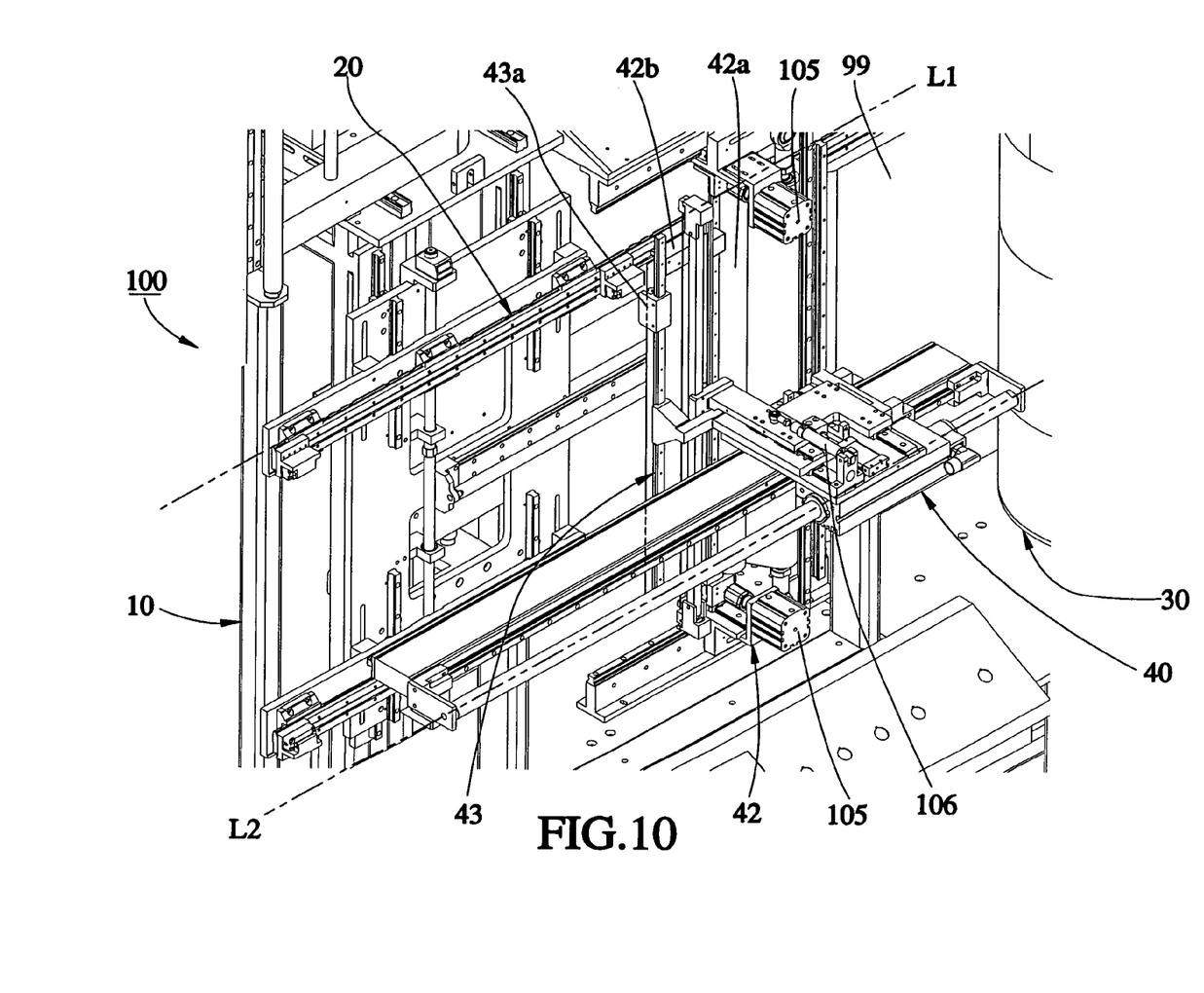
FIG. 10 is an enlarged view in part of FIG. 9.

The film base 30 is mounted on the horizontal plate 12 of the frame 10, which has a carrier 31, a worm bar 32 and an adjusting member 33. The adjusting member 33 includes a block in the present embodiment to support the carrier 31. The block has an interior threaded section (not shown) to be meshed with the worm bar 32. As shown in FIG. 9 and FIG. 10, rolls of film 99 with various sizes may be fitted to the worm bar 32 and rested in the carrier 31. The adjusting member 33 is turned to align the film 99 with the arms 21 so that the film 99 drawn out of the roll may be held by the arms 21. The film base 30 works with a fixing device 34 on the frame 10 for the film 99. The roll of the film 99 includes a hollow core 99*a*. The fixing device 34 includes a base 341 for horizontal movement and a pneumatic cylinder 342 connected to the base 341 to move the base 341 backwards for loading the roll of the film 99 on the film base 30. The base 341 is moved forwards by the pneumatic cylinder 342 again over the roll of the film 99. The base 341 has a motor 34*a* to turn a fastener 35 and a cylinder 104 to move the fastener 35 up and down. The fastener 35 is a cylinder in the present embodiment, which is a conventional device and will not describe the detail here. The fastener 35 is driven by the cylinder 104 to extend into the hollow core 99*a* so that the roll of the film 99 may be turned by the motor 34*a* of the fixing device 34.

As shown in FIGS. 10 to 13, the drawing device 40 is mounted beside the feeding device 20, which includes a first driving member 41, a first drawing member 42 and a second drawing member 43.

The first drawing member 42 is a serve axle provided on the frame 10 in the present embodiment for reciprocation along a second axis L2. The second axis L2 is an axial direction of the serve axle.

Figure 12:
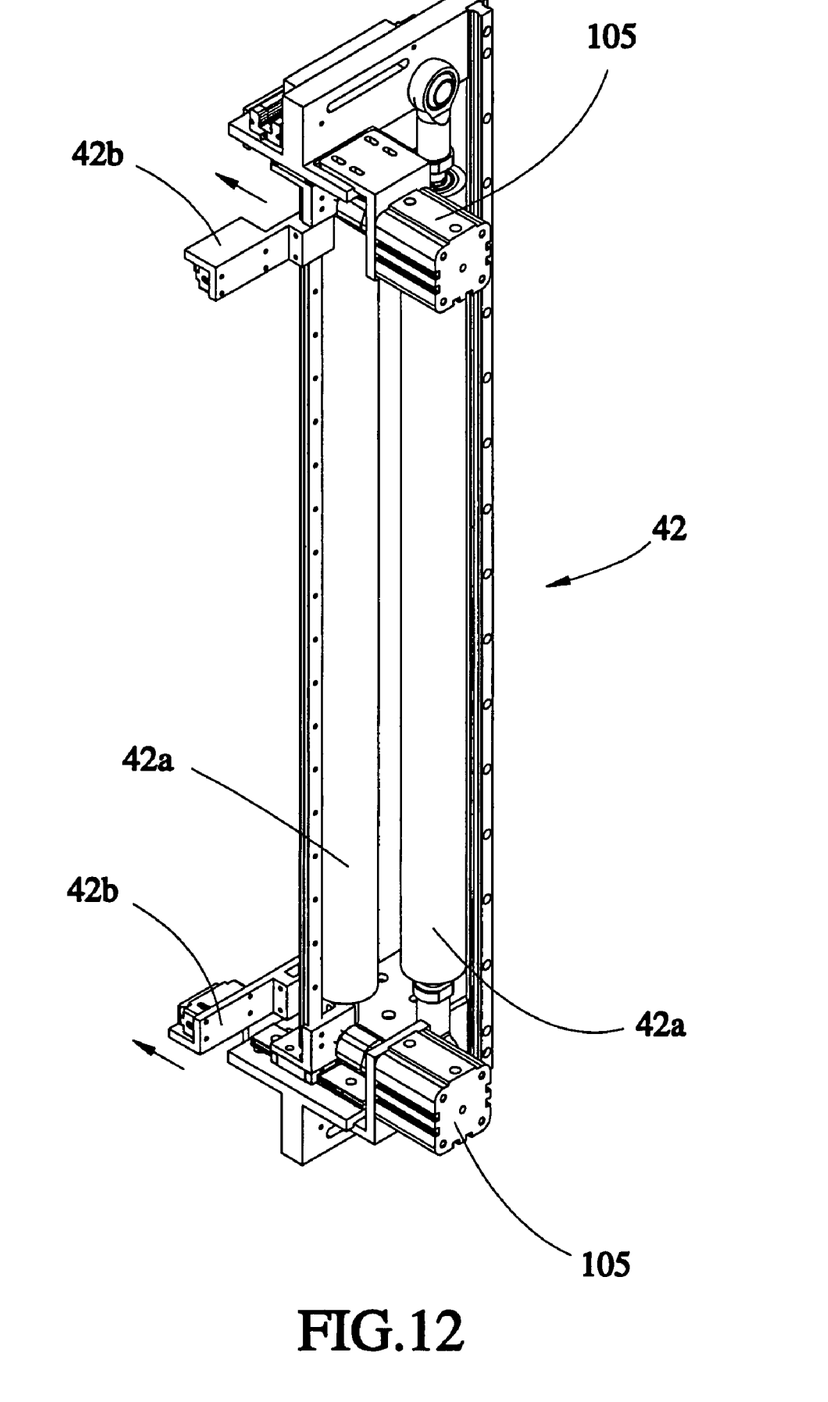
FIG. 12 is a perspective view of the first drawing member at the position before being moved by the cylinder.
Figure 13:
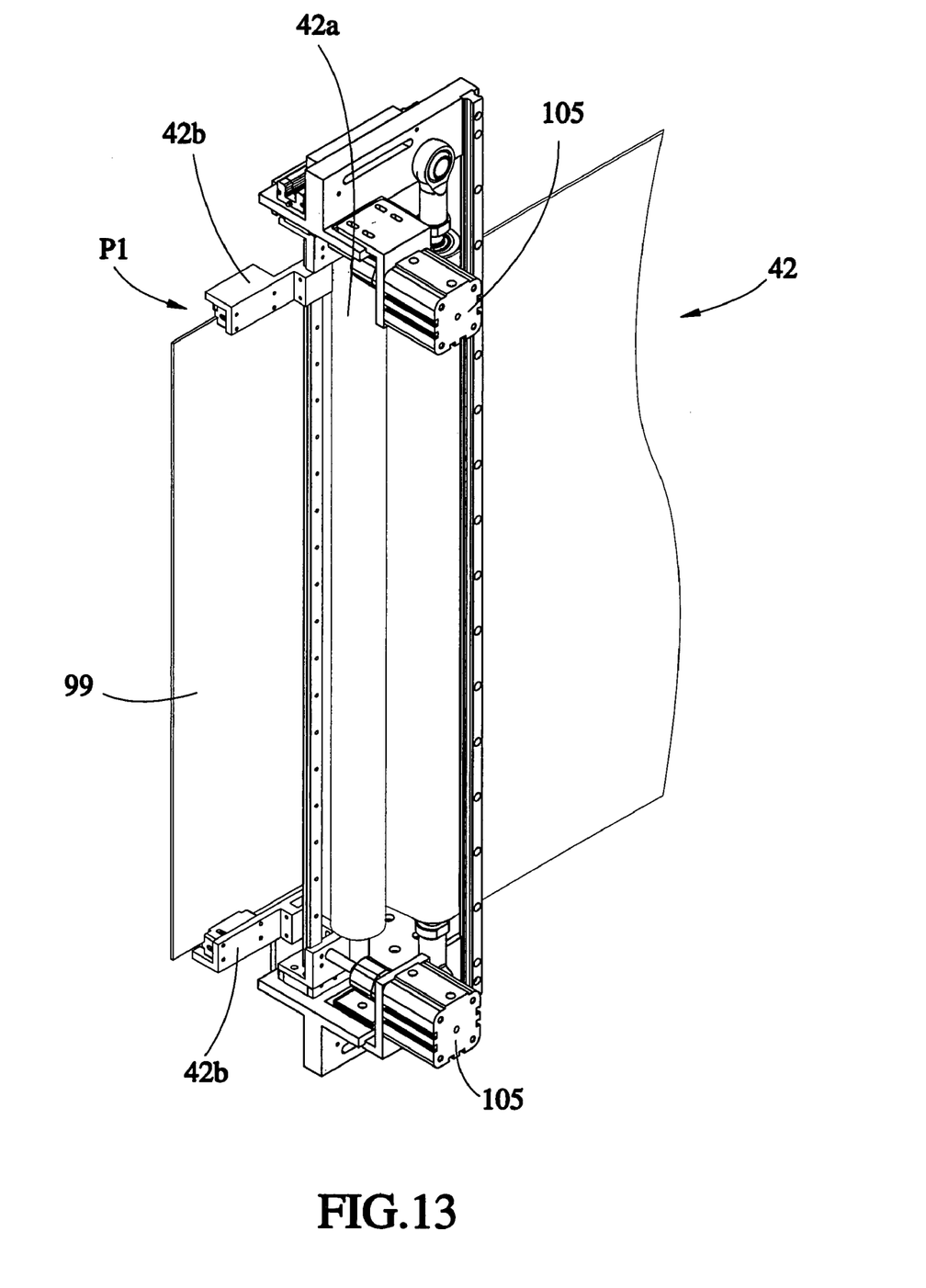
FIG. 13 is a perspective view of the first drawing member being moved by the cylinder along the first axis to the plane of the film.
Figure 14:
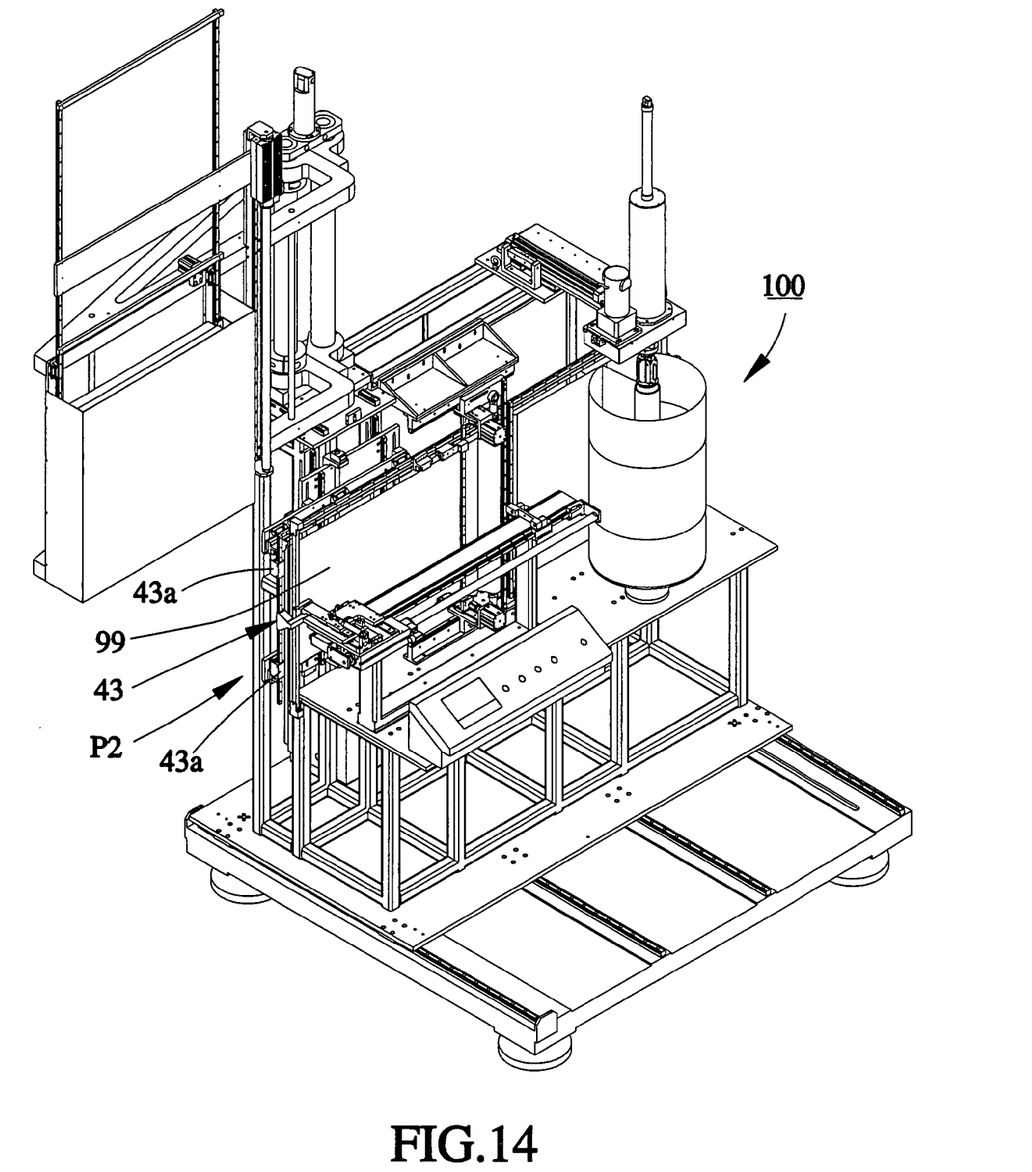
FIG. 14 is a perspective view of the film at the second position.
Figure 15:
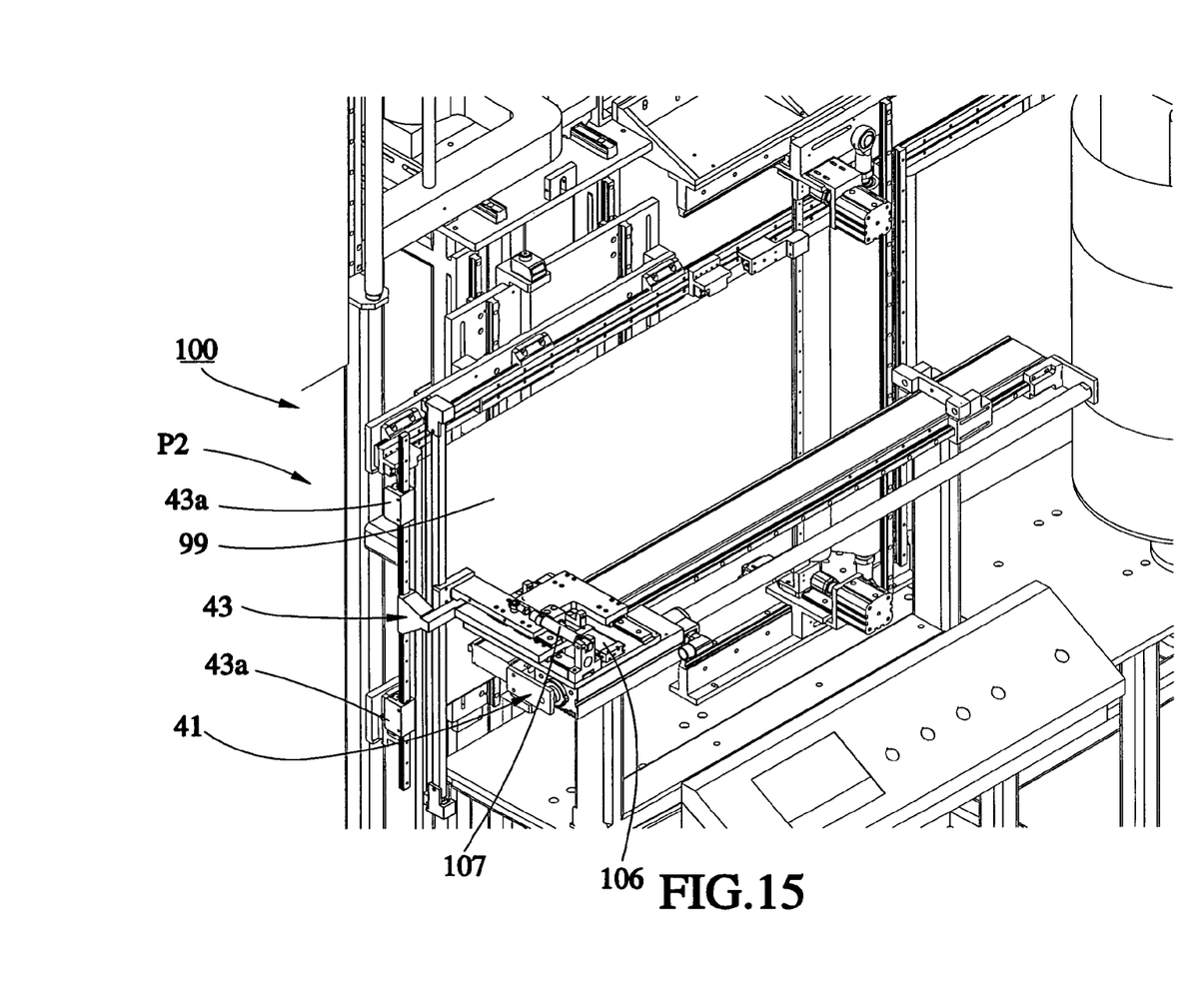
FIG. 15 is an enlarged view in part of FIG. 14.

As shown in FIG. 12 and FIG. 13, the first drawing member 42 is mounted on the frame 10 including a turning portion consisting of a set of rollers 42*a*, and a clip portion consisting of two clip cylinders 42*b*. The film 99 passes through rollers 42*a* to keep the direction of the film 99 and provide the film with a predetermined tension. The clip cylinders 42*b* may be adjusted to change a distance therebetween to fit various sizes of the films and may be moved by two cylinders 105 to a first position P1 (referring to FIG. 13) close to the first axis L1 to hold the film 99 from a position shown in FIG. 12.

Figure 11:
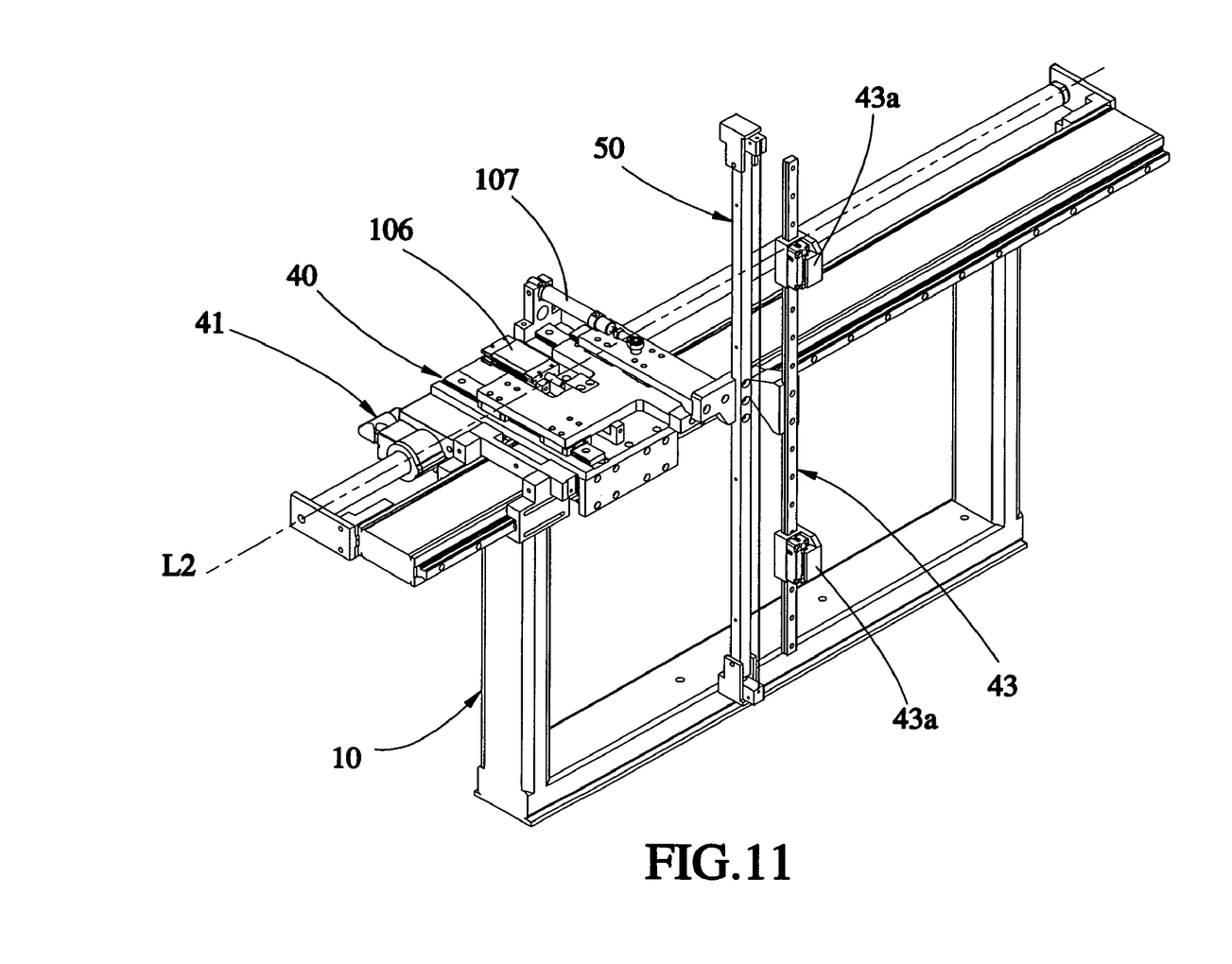
FIG. 11 is a perspective view of the drawing device, the first driving device and the cutting device.

As shown in FIG. 11, the second drawing member 43 has two clip cylinders 43*a*, which are connected to the first driving device 41 by a cylinder 106. The clip cylinders 43*a* are moved by the cylinder 106 toward the first axis L1 to a predetermined position for holding the film 99 and are moved by the first driving device 41 to move the film 99 between a first position P1, in which the film 99 is held by the first drawing member 42 (referring to FIG. 13), and a second position P2, in which the film 99 is held by the feeding device 20 (referring to FIG. 14 and FIG. 15).

Figure 16:
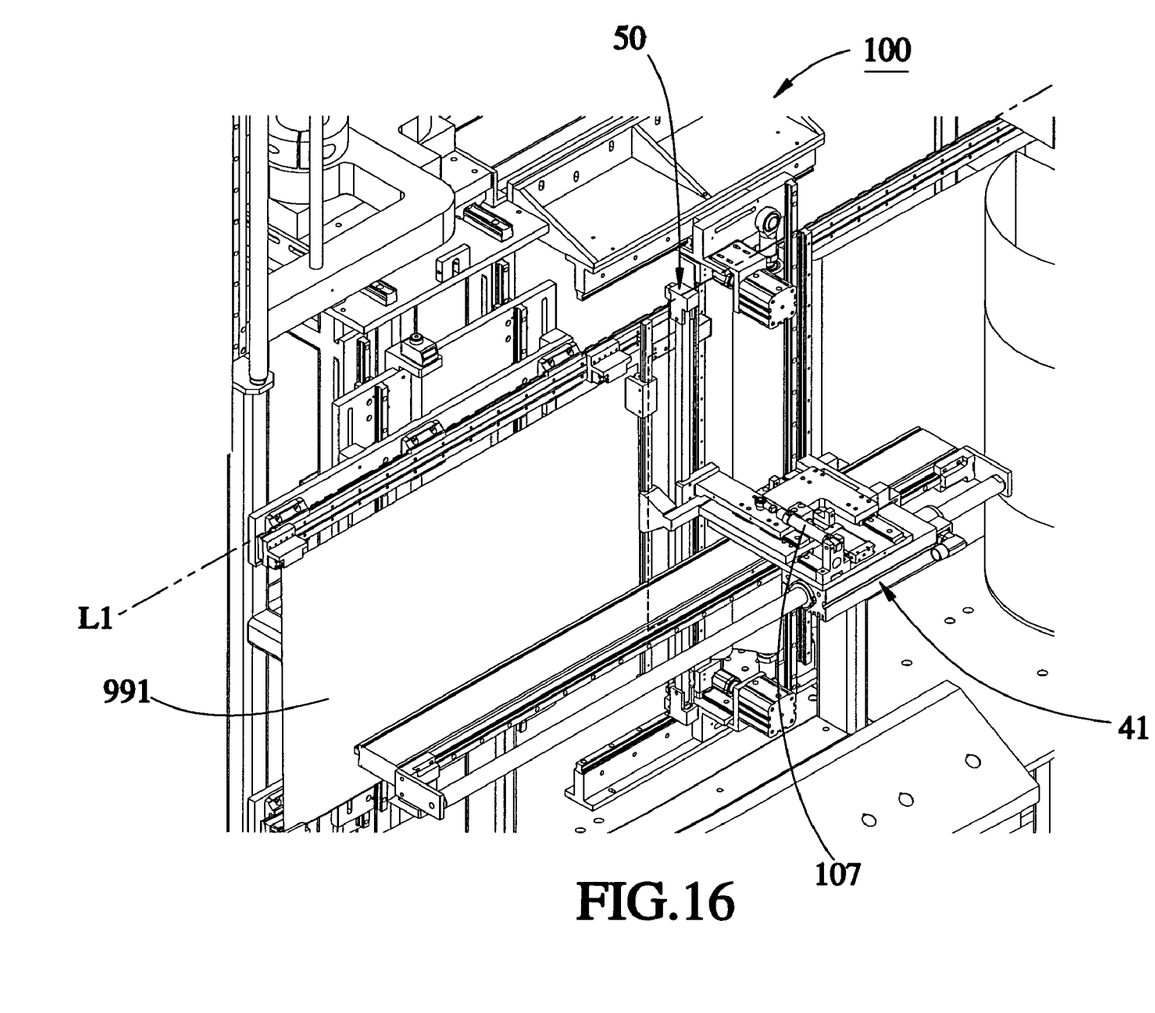
FIG. 16 shows the cutting device cutting the film into pieces.
Figure 17:
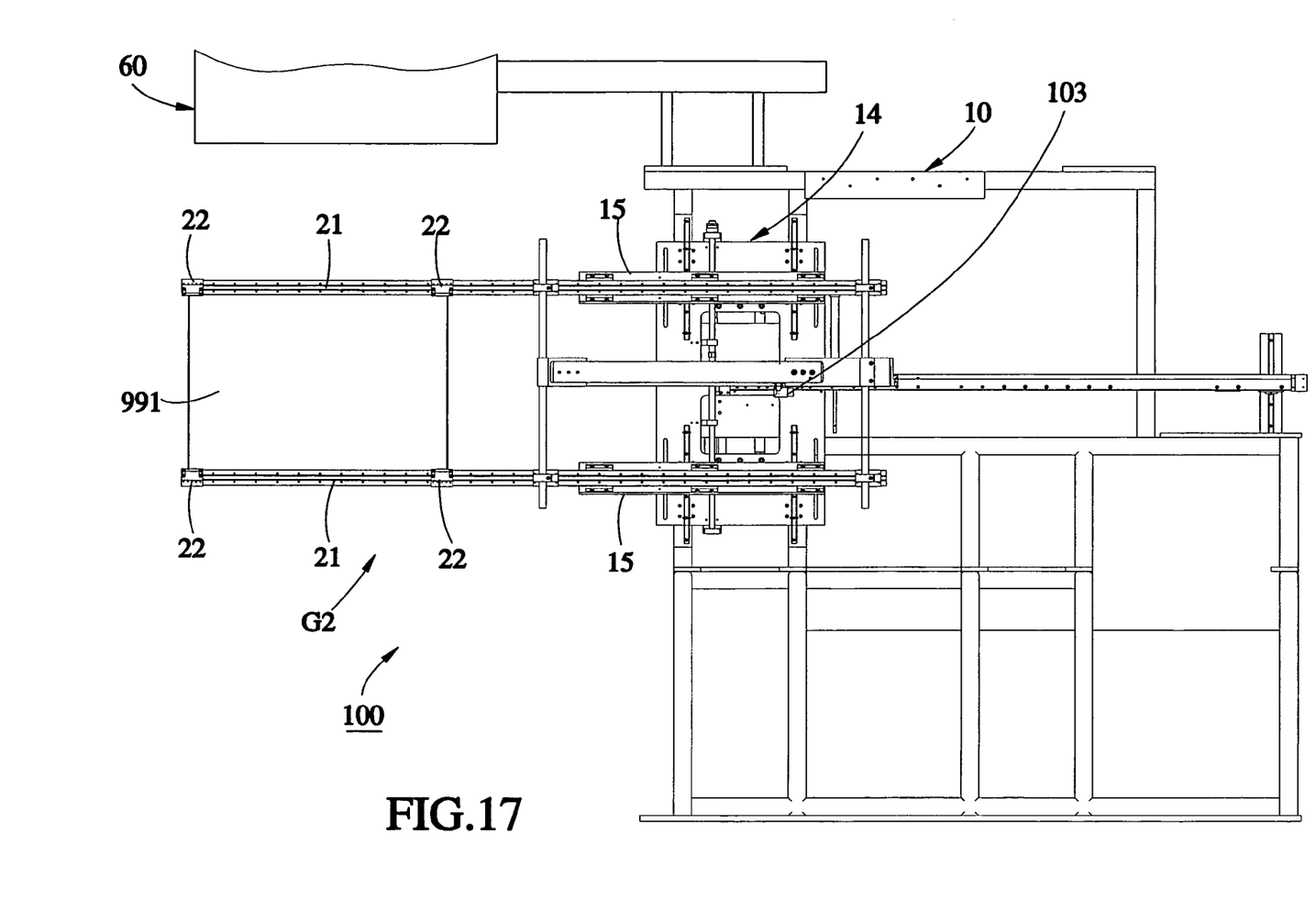
FIG. 17 is a front view of the arms before extended out.

As shown in FIG. 11, the cutting device 50 is connected to the first driving device 41 through a cylinder 107 to be moved toward the first axis L1 for cutting the film 99 off and get a film piece 991 (referring to FIG. 16).

As shown in FIG. 6, the heating device 60 is pivoted on the frame 10 to be moved along a direction perpendicular to the first axis L1. The heating device 60 is moved beside the film piece 99,1 for heating it while the arms 21 of the feeding device 20 holds the film piece 991 and moves to the extended position G2 (referring to FIG. 17). It takes less space. The heating device 60 may be may be leaned toward a front side of the frame 10 that provides a space for repair or other tasks.

Figure 18:
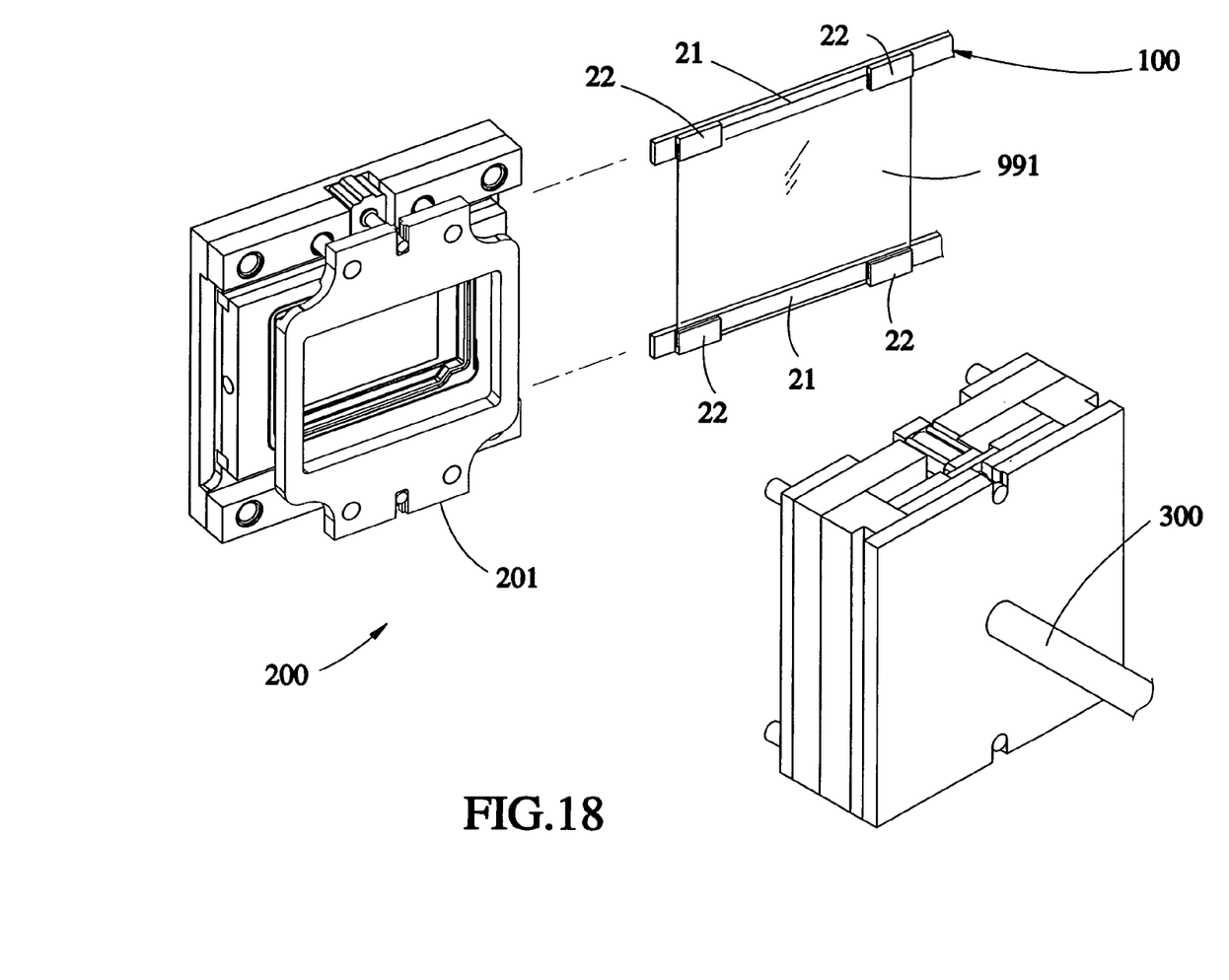
FIG. 18 is a perspective view of the film feeding machine incorporated in the die assembly and injection molding machine.

As shown in FIG. 18, in operation, the die assembly 200 and the injection molding machine 300 are fixed at predetermined positions, and the feeding machine 100 of the present invention is operated to have the arms 21 of the feeding device 20 moved by the serve axle 101 and the worm bars 16 to a desired position for feeding the film 99 into the die assembly 200. As shown in FIG. 9, after the arms 21 had been adjusted to a desired position, the film 99 is put on the film base 30, and a height of the film base 30 is adjusted to align the film 99 with the arms 21. Next, the clip cylinders 42*b* of the first drawing member 42 is moved to the position shown in FIG. 13 from the position shown in FIG. 12 to locate the clip cylinders 42*b* and the film 99 at the same level. The fixing device 34 is operated to hold and tension the film 99. Next, the film 99 is drawn out and passes through the rollers 42*a* of the first drawing member 42 and then held by clip cylinders 42*b* (referring to FIG. 13). In the meantime, the motor 34*a* of the fixing device 34 turns backwards to draw the film 99 back that may provides the film a predetermined tension. Next, the second drawing member 43 is moved by the cylinder 106 to a plane where the film 99 is on, and the clip cylinders 43*a* hold the film 99 prior to the clip cylinders 42*b* of the first drawing member 42 release the film 99. The first driving device 41 is moved away from the film base 30 along the second axis L2 to have the second drawing member 43 drawing the film 99 to the second position P2 (referring to FIG. 14, in which the second drawing member 43 is over the two clip cylinders 22 of the arms 21 distal to the film base 30). Meanwhile, the two clip cylinders 22 of the arms 21 proximal to the film base 30 hold opposite sides of the film 99 first, and then the first driving device 41 moves the second drawing member 43 a little to rear ends of the arms 21, and then the other two clip cylinders 22 on the arms hold the opposite sides of the film 99 to keep the film 99 with a predetermined tension and flat. After the film 99 is held by the arms 21, the clip cylinders 43*a* of the second drawing member 43 release the film 99, and the first driving device moves the second drawing member 43 toward the rear ends of the arms 21 a little and the cylinder 106 moves the second drawing member 43 away from the film 99 that the second drawing member 43 will not touch the film 99. Next, the first driving device 41 moves the second drawing member 43 back to the position shown in FIG. 16 to have the cutting device between the first drawing member 42 and the clip cylinder close to the film base 30. After that, the cylinders 42*b* of the first drawing member 42 hold the film 99 again and the cutting device 50 is moved by the cylinder 107 toward the first axis L1 to cut the film 99 off. Because the film 99 is held at opposite sides of the cutting device 50, the film 99 and the film piece 991 keep flat still. After the film 99 is cut, the clip cylinders 42*b* of the first drawing member 42 moved back along the second axis L2 to the position shown in FIG. 12. Next, the sensor 17 (such as sensing cylinder) senses targets (not shown) on the film 99 automatically to control the serve axles 101 and 103 precisely adjusting the position of the film piece 991. After that, the film feeding machine 100 is waiting for the order of the external equipment. In the present embodiment the external equipment is the die assembly 200 and the injection molding machine 300. When the film feeding machine 100 receives the order of the external equipment (it means the die assembly 200 and the injection molding machine 300 are ready), the arms 21 move into the die assembly 200, and a plate 201 of the die assembly 200 will hold the film piece 991. After that, the clip cylinders 22 release the film 99 and back to the feeding machine 100. Next, the heating device 60 is moved downward into the die assembly to heat the film piece 991. The heating device 60 is moved back to the feeding machine after a setting time to let the die assembly 200 and the injection molding machine 300 performing the injection molding process. When the injection molding process is proceeding, the feeding machine 100 proceeds above steps to ready another film piece 991 so that when injection molding process is done and the die assembly 200 is opened to get a product out, the feeding machine 100 may feed the film piece 991 into the die assembly 200 without any time delay. In addition, because the film piece 991 had been cut and positioned before being fed into the die assembly 200. It doesn't like the conventional process having the film being cut and positioned in the die assembly that causes the problems of film waste and higher defective ratio. The feeding machine 100 and the heating device 60 have the same frame 10 and controller that have a lower cost and less space taken.

The description above is a preferred embodiment of the present invention and the equivalence of the present invention is still in the scope of the claim of the present invention.

What is claimed is:

1. A film feeding machine, comprising:
   a frame having a horizontal plate and a vertical plate;
   a film base vertically provided on the horizontal plate of said frame and located in front of the vertical plate, comprising means for carrying a continuous film vertically;
   a feeding device provided on the vertical plate, the feeding device being movable between an extended position and a retracted position along a first axis parallel to the vertical plate and comprising means for holding and transporting the film vertically;
   a drawing device, which is located beside the first axis and faces the feeding device, comprising means to draw the film out of the film base long a path parallel to the first axis to a position for being held by the feeding device;
   a cutting device, which is located beside the first axis and between the feeding device and the film base and faces the feeding device, and comprising means for cutting the film off to have a film piece, and
   wherein the drawing device includes a first drawing member and a second drawing member, wherein the first drawing member is adapted to fix the film drawn out of the film base at a first position and the second drawing member is adapted to draw the film to a second position, in which the film is held by the feeding device, from the first position.

2. The film feeding machine as defined in claim 1, wherein the first drawing member is mounted on the frame and has a turning portion to fix the film along a direction of the film being drawn out of the film base, and the drawing device further includes a first driving device mounted on the frame and movable along a second axis, to which the second drawing member is connected.

3. The film feeding machine as defined in claim 2, wherein the turning portion is a set of rollers, between which film passes through.

4. The film feeding machine as defined in claim 3, wherein the first drawing member includes a clip portion to be moved a predetermined beside the first axis for holding the film at the first position.

5. The film feeding machine as defined in claim 2, wherein the cutting device is connected to the first driving device to be moved by the first driving device toward the first axis for cutting the film off.

6. The film feeding machine as defined in claim 1, wherein the frame has a support base, on which the feeding device is provided to be moved along the first axis, and the support base is movable relative to the frame along a direction substantially perpendicular to the first axis.

7. The film feeding machine as defined in claim 6, wherein the support base is provided with two rail bases, and the feeding device includes two arms, which are connected to the rail bases respectively, to be operated for movement relative to the rail bases along the first axis, and a clip portion to hold the film.

8. The film feeding machine as defined in claim 7, wherein rail bases are movable relative to each other.

9. The film feeding machine as defined in claim 1, wherein the film base includes an adjusting member to move the film to a desired position and held by the feeding device after being drawn out.

10. The film feeding machine as defined in claim 1, further comprising a fixing device including a motor driving a fastener and a cylinder moving the fastener up and down, wherein the fastener is a cylinder for extension and retraction.

11. The film feeding machine as defined in claim 1, wherein the frame is provided with a sensor to sense the film for controlling the feeding device moving along the first axis and along the direction perpendicular to the first axis.

12. The film feeding machine as defined in claim 1, further comprising a heating device provided on the frame to be moved along a direction perpendicular to the first axis, wherein when the feeding device holds the film and moves to the extended position, the heating device is moved to a position associated with the film.

* * * * *